July 26, 1955 G. S. A. DAHL ET AL Re. 24,045

DENTAL PROSTHESIS

Original Filed Nov. 12, 1949

GUSTAV SVEN ADOLF DAHL,
SVEN BERTIL ALMER,
INVENTORS.

BY Hlalvin White

ATTORNEY.

United States Patent Office

Re. 24,045
Reissued July 26, 1955

24,045

DENTAL PROSTHESIS

Gustav Sven Adolf Dahl and Sven Bertil Almer, Stockholm, Sweden

Original No. 2,672,687, dated March 23, 1954, Serial No. 126,766, November 12, 1949. Application for reissue January 24, 1955, Serial No. 483,857

9 Claims. (Cl. 32—10)

Figure 4:
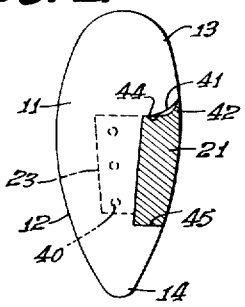

Matter enclosed in heavy brackets [ ] appears in the original patent but forms no part of this reissue specification; matter printed in italics indicates the additions made by reissue.

The present invention relates to dental prostheses, and more particularly to those which consist of a supporting body of metal, generally gold, and a facing or a similar tooth imitation of an artificial material, previously usually porcelain but nowadays also artificial resin, such as acrylic resin, the metallic support being intended to form an attachment within or at the side of the existing teeth and the facing being adapted to give the prosthesis a natural appearance, especially on the outwards directed or otherwise visible part of the prosthesis. Examples of prostheses of the present kind are particularly so-called bridges where the prosthesis is suspended to adjacent teeth, and pivot teeth where the prosthesis is anchored in a remaining natural root of a tooth. In hitherto occurring types of prostheses of the present kind the metallic body is usually provided with projections which accurately fit in corresponding recesses provided in the facing. These connecting members have been so designed that the facing could be applied to the supporting body in a quite definite direction only, which has been considered to be necessary with the previously available possibilities of obtaining a firm and rigid connection between these parts. For the junction there has been employed, besides the purely mechanical anchoring means, a binding agent of ordinary kind, e. g. phosphate cement, whether the facing has been made of porcelain or of artificial resin. In case of artificial resin prostheses it has, moreover, been usual to produce the prostheses by moulding the facing from the artificial resin compound and pressing it directly onto the metallic support and then subjecting it to final treatment, usually an operation of polymerization, at an elevated temperature.

However, it has been found that in connection with dental prostheses consisting of metallic body with retentions and facing or similar tooth imitation made of soluble artificial resin, preferably acrylic resin, it is possible to bring about a much easier method of applying the facing and to obtain at the same time a considerably better connection between the parts, if the facing or the like is secured to the metallic body by means of a binding agent, melted together with the facing by means of a solvent or a plasticizer, such as ethyl acetate or preferably chloroform, said binding agent being suitably produced on the basis of artificial resin, preferably from the same artificial resin basal material as the facing. Preferably the inside of the facing is so designed that the facing may, notwithstanding the retentions of the metallic body, be applied into its final position onto the metallic body from a plurality of different directions. The facing is suitably so shaped that during the application it is movable substantially parallel to the main stretch of its contact with the metallic body at least until its final position has been reached or has been nearly reached.

*I provide the rearward side portion of the vertically elongated resinous tooth body opposite its front or outer facing with inwardly recessed and relatively large sized*

*engagement surfaces having transverse and vertically elongated extent relative to said body within a recess at the rear side of the body, said surfaces being of such shape and form that the tooth body may be frontally applied onto a dental support with desired vertical adjustability for accurately and strongly bonding the tooth surfaces to complementary support surfaces, as by means of one of the resinous bonding agents to be described. The engagement surfaces extend into the rearward side portion of the tooth body toward the outer face thereof and transversely through the body between opposite sides thereof and above the tooth root to form the recess. In addition, the engagement surfaces provide load resisting transverse and vertically elongated shoulders for interengagement with complementary shoulders carried by the dental support and receivable within the recess, the former shoulders being formed to accommodate vertical adjustability of the tooth on the support during its application thereto.*

*Specifically, vertically separated transverse shoulders are provided with transverse surfaces extending substantially away from the front face of the tooth in a relatively diverging sense to accommodate reception therebetween of a tapered transverse lamella carried by the support, and laterally separated vertically elongated shoulders are formed on opposite sides of a groove adapted to receive a vertically elongated lamella carried by the support to resist lateral displacement of the tooth thereon.*

*The engagement surfaces comprise a resinous material susceptible to plasticising and molecular bonding with the resinous bonding agent applicable thereto for rigidly joining the tooth to the support in final adjusted position.*

The invention will be more closely described in the following with reference to some realizations shown in the accompanying drawing merely as illustrative examples and not in a limiting sense, and in addition comparisons are made with previously known arrangements intended for the same purpose.

Figure 5:
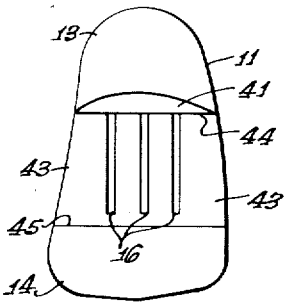
Figure 3:
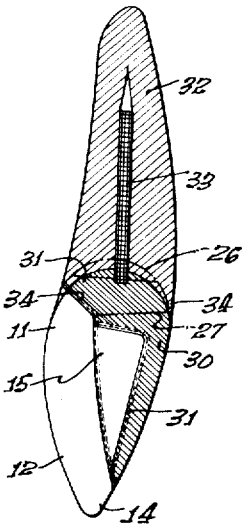
Figure 1:
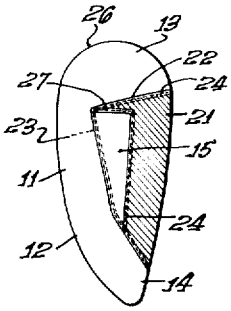
Figure 2:
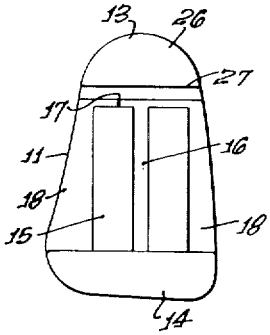

In the drawing, Figures 1 to 5 show embodiments according to the invention, Figures 1 and 4 showing facings disposed on bridges, Figures 2 and 5 showing the facings proper, as viewed from the inside, and Figure 3 shows the facing of Figures 1 and 2 adapted for a pivot tooth.

According to the present invention there is employed a binding agent which binds firmly to the facing, preferably one having substantially the same elastic properties as the facing material and, as a result, new promising possibilities present themselves. A preferred binding agent consists of a synthetic resin polymer, suitably of acrylic resin, such as polymethyl methacrylate, dissolved by or at least swelled up with a solvent for the resin, preferably chloroform. In many occasions it is still better for this purpose to use a mixture of monomer and polymer acrylic resin, preferably containing hardening controlling substances, such as benzoyl peroxide and tributyl amine in appropriate concentrations. Thus, a binding agent of this kind will, after its application, dissolve or at least soften the surface layers of the facing whereby the solid binding agent remaining after the evaporation of the solvent or the absorption of the same in the physical tissues will have imperceptibly passed over, intimately and without any seam, into the material of the facing especially if the facing material and the binding agent consists of the same kind of synthetic resin. Since the binding agent thus may be said to form an integrating part of the facing body and is entirely plastic during the application of the facing to the supporting body and thus can penetrate into all retentions and irregularities therein, the facing will after the setting of the binding agent be immovably and firmly anchored in the supporting body.

Although acrylic acid has been particularly mentioned as a basic substance for a synthetic resin for the present purpose, it will be understood that many other plastics are useful than those derived therefrom. Thus polystyrene and polyvinylchlorideacetate may be used. Apart from monomerpolymer-mixtures and chloroform already mentioned, also acetone, methyl ethyl ketone, ethyl acetate and ethylene dichloride as well as, possibly, toluene, benzene, butyl acetate and amyl acetate may come in consideration. Lower alcohols, such as ethyl, methyl and butyl alcohol, and carbon tetrachloride, may have some value.

Through this new method of applying a facing it is, on the other hand, rendered possible to make the facing with greater freedom so that guide and anchoring members of the known kind may be dispensed with and the facing may in lieu thereof be so shaped that, at least during the very greatest part of the application to the supporting body, it may be applied from more or less different directions.

The facing 11 shown in Figures 1 and 2 is, on its front side 12, shaped as a natural tooth and has at one end a root tip 13, which is intended [for the cavity after an extracted] *to seat within the jaw cavity formed upon extracting a* tooth. On the backside, the facing has at the top a shoulder 14 which should be shaped in accordance with the natural tooth. Between the root tip 13 and the shoulder 14 the facing is provided with a number of grooves or slots and ground-off portions which, in the instance shown, leave two *shoulder forming* elevations *or projections* 15. Between these there is a vertical groove 16, and between the elevations and the root tip there is a horizontal *shoulder forming* groove or slot 17. These grooves or slots are at right angles to each other and are so disposed as to form a T. Laterally of the elevations the facing is provided with recesses 18.

The supporting body, which in Figure 1 consists of a bridge, 21 is provided with projections or lamellae, namely 22 extending into the horizontal groove 17 and 23 extending into vertical groove 16. Moreover, the bridge may have lamellae corresponding to the recesses 18. In certain places or everywhere on its surface, the supporting body has retentions 24 which preferably are wider inwards than at the mouths and may ocnsist of projecting flanges or pricks or the like.

In Figures 4 and 5 another embodiment is illustrated in which the bridge 21 has projecting beams or lamellae 23 provided with trough-holes 40 into which the binding agent can penetrate to form supporting and anchoring beams. The tip 13 is bevelled as indicated at 41 for engaging smoothly the upstanding collar 42 of the bridge. The bridge has three parallel lamallae 23 and as shown in Figure 5 the facing has three corresponding grooves or slots 16 in the cavity 43 over which the root tip 13 and the crown tip 14 stick out to form seats 44 and 45 for the bridge.

Although the grooves or slots 16 and 17 may widen somewhat inwards, this is not at all necessary but on the contrary disadvantageous, and it is most often preferable if they taper inwards, however, these grooves should conform rather closely with the corresponding projections or lamellae 22 and 23, respectively, on the supporting body in order that the requisite quantity of binding agent be small. Nevertheless, it is evident that the grooves or slots may be so shaped [as to permit] that the facing 11 need not be applied in such a definite direction as in the prior art devices, but [far more] *to* render[s] possible an extensive freedom in the choice of direction of application. However, the innermost portions of the grooves and the outermost edges of the supporting body should fit accurately in each other so that the final position becomes fixed.

Figure [6] *3* shows how a facing according to Figures 1 and 2 may, by merely grinding-off the root tip 13, be converted into a facing adapted for a pivot tooth. The facing of Figures 4 and 5 may, of course, be treated analogously. The contour 26 of the root tip and its inner surface 27 are represented in Figure 3 by means of dot and dash lines. The supporting body 30 is, in the same way as the supporting body 21, provided with retentions 31 but extends, in contrast to the body 21, farther downwardly towards the root portion, [and also there] *where* it may *also* have retentions. In relation to the facing, the body 30 is in other respects shaped substantially identically with the bridge body 21 so that the same facing may fit a bridge as well as a pivot.

The supporting body 30 is secured, in accordance with conventional dental practice, in the tooth root 32 by means of a pivot 33. A mantle 34 is tightly secured on the upper edge of the root in the usual manner.

Through the invention it is also made possible to provide the supporting body with reinforcing beams so that its strength is increased, with a resultant considerable saving of material.

The grooves or slots 16 and 17 are preferably at an angle to each other, as shown in Figure 2, but the angle may be of a magnitude other than 90°. The grooves may also be disposed in a fish-bone like manner or crosswise. Further they may depart from the rectilinear form and be, for instance, circular, semicircular or annular. It is essential, however, that they permit of an application in at least some directions differing more or less from each other. They should also afford supporting surfaces for vertical as well as horizontal pressures.

What is claimed is:

1. A detail prosthesis, comprising, in combination, an elongated tooth member of artificial resin having a front face and a rear face; a cut-out arranged in said rear face of said elongated tooth member and having a top and bottom face being spaced apart from the top and bottom edges, respectively, of said elongated tooth member and a lateral engagement face provided with at least two elongated recesses therein arranged substantially normally to said lateral engagement face of said cut-out and extending parallel to the axis of said elongated tooth member substantially from the top of the bottom face of said cut-out; a supporting metal body including a backing portion fitting into said cut-out of said elongated tooth member and having a top and bottom edge and a frontal engagement face located between said edges and engaging said lateral engagement face of said cut-out; at least two projecting lamellae on said frontal engagement face of said backing portion projecting substantially normally to said frontal engagement face, extending substantially from said top edge to said bottom edge of said backing portion and being shaped for entering said elongated recesses in said lateral engagement face of said cut-out whereby said backing portion of said supporting body and said lamellae thereon can be brought to engagement with said cut-out and elongated recesses, respectively, of said elongated tooth member only by a motion thereof being substantially normal to said engagement faces of said elongated tooth member and said backing portion; and binder means retaining said backing portion and said lamellae thereon in said cut-out and elongated recesses, respectively, of said elongated tooth member.

2. A dental prosthesis, comprising, in combination, an elongated tooth member of artificial resin having a front face and a rear face and having at least two elongated recesses in said rear face arranged substantially normally to said rear face and extending parallel to the axis of said elongated tooth member and spaced from the top and bottom edges of the same so as to be closed along their tops and bottoms, respectively; a supporting metal body including a backing portion having a top and bottom edge and a frontal engagement face located between said edges and engaging said rear face of said elongated tooth member; at least two projecting lamellae on said frontal engagement face of said backing portion projecting substantially normally to said frontal engagement face, extending substantially from said top edge to said bottom edge of said backing portion and being shaped for entering said elongated recesses in said rear face of said elongated tooth member whereby said lamellae on said backing portion of said supporting body can be brought to engagement with said elongated recesses in the rear face of seaid elongated tooth member only by a motion thereof being substantially normal to said rear face of said facing member; and binder means retaining said lamellae in said elongated recesses so as to firmly attach said elongated tooth member to said backing portion of said supporting body.

3. A dental prosthesis, comprising, in combination, an elongated tooth member having a front face and a rear face; a cut-out arranged in said rear face of said elongated tooth member and having a top and bottom face being spaced apart from the top and bottom edges, respectively, of said elongated tooth member and a lateral engagement face provided with at least two elongated recesses therein arranged substantially normally to said lateral engagement face of said cut-out and extending parallel to the axis of said elongated tooth member substantially from the top to the bottom face of said cut-out; a supporting metal body including a backing portion fitting into said cut-out of said elongated tooth member and having a top and bottom edge and a frontal engagement face located between said edges and engaging said lateral engagement face of said cut-out, said top and bottom faces of said cut-out flaring slightly outward from said lateral engagement face toward said rear face of said elongated tooth member; at least two projecting lamellae on said frontal engagement face of said backing portion projecting substantially normally to said frontal engagement face, extending substantially from said top edge to said bottom edge of said backing portion and being shaped for entering said elongated recesses in said lateral engagement face of said cut-out whereby said backing portion of said supporting body and said lamellae thereon can be brought to engagement with said cut-out and elongated recesses, respectively, of said elongated tooth member only by a motion thereof being substantially normal to said engagement faces of said elongated tooth member and said backing portion; and binder means retaining said backing portion and said lamellae thereon in said cut-out and elongated recesses, respectively, of said elongated tooth member.

4. A dental prosthesis, comprising, in combination, an elongated tooth member of artificial resin having a front face and a rear face; a cut-out arranged in said rear face of said elongated tooth member and having a top and bottom face being spaced apart from the top and bottom edges, respectively, of said elongated tooth member and a lateral engagement face provided with at least two elongated recesses therein arranged substantially normally to said lateral engagement face of said cutout and extending parallel to the axis of said elongated tooth member substantially from the top to the bottom face of said cut-out; a supporting metal body including a backing portion fitting into said cut-out of said elongated tooth member and having a top and bottom edge and a frontal engagement face located between said edges and engaging said lateral engagement face of said cut-out; at least two projecting lamellae on said frontal engagement face of said backing portion projecting substantially normally to said frontal engagement face, extending substantially from said top edge to said bottom edge of said backing portion and being shaped for entering said elongated recesses in said lateral engagement face of said cut-out whereby said backing portion of said supporting body and said lamellae thereon can be brought to engagement with said cut-out and elongated recesses, respectively, of said elongated tooth member only by a motion thereof being substantially normal to said engagement faces of said elongated tooth member and said backing portion; and a binder consisting of a material containing synthetic resin, said binder filling the portions of said recesses unoccupied by said lamellae and of said cut-out unoccupied by said backing portion whereby said supporting metal body and the lamellae thereon are firmly held in said cut-out and the recesses respectively in said elongated tooth member.

5. A dental prosthesis, comprising, in combination, an elongated tooth member of artificial resin having a front face and a rear face and having at least two elongated recesses in said rear face arranged substantially normally to said rear face and extending parallel to the axis of said elongated tooth member and spaced from the top and bottom edges of the same so as to be closed along their tops and bottoms, respectively; a supporting metal body including a backing portion having a top and bottom edge and a frontal engagement face located between said edges and engaging said rear face of said elongated tooth member; at least two projecting lamellae on said frontal engagement face of said backing portion projecting substantially normally to said frontal engagement face, extending substantially from said top edge to said bottom edge of said backing portion and being shaped for entering said elongated recesses in said rear face of said elongated tooth member whereby said lamellae on said backing portion of said supporting body can be brought to engagement with said elongated recesses in the rear face of said elongated tooth member only by a motion thereof being substantially normal to said rear face of said facing member, each of said lamellae being formed with at least one retention hole; and a binder consisting of a material containing a synthetic resin, said binder penetrating into said retention holes of said lamellae, filling the portions of said recesses unoccupied by said lamellae and of said cut-out unoccupied by said backing portion whereby said lamellae are firmly embedded in said binder penetrating said retention holes firmly securing said supporting body to said elongated tooth member.

*6. An artificial tooth adapted to be frontally joined to a dental support, said tooth comprising a vertically elongated hardened resinous body having a tooth shaped outer face and a rear face opposite thereto, said body including inwardly recessed engagement surfaces having transverse and vertically elongated surface extent relative to said body for engagement with complementary dental support surfaces and forming a recess in said rear face extending toward said outer face interiorly of said body and transversely therethrough between opposite sides thereof, said surfaces forming a substantially transverse shoulder extending away from said outer face for interengagement with a complementary shoulder carried by said support and receivable within said recess and transversely separated substantially vertically elongated shoulders extending away from said outer face on opposite sides of a groove adapted to receive a projection carried by said support and said surfaces being formed to accommodate vertically adjustable frontal application of said tooth on said support opposite complementary surfaces formed thereon, and said engagement surfaces being susceptible to plasticizing and molecular bonding with a resinous bonding agent applicable thereto for rigidly joining said tooth to said support in vertically adjusted position thereon.*

*7. An artificial tooth adapted to be frontally joined to a dental support, said tooth comprising a vertically elongated hardened resinous body having a tooth shaped outer face and a rear face opposite thereto, said body including inwardly recessed engagement surfaces having transverse and vertically elongated surface extent relative to said body for engagement with complementary dental support surfaces and forming a recess in said rear face extending toward said outer face interiorly of said body and transversely therethrough between opposite sides thereof, said surfaces forming a pair of transversely separated substantially vertically elongated projections on opposite sides of a groove extending toward said outer face and adapted to receive a lamella carried by said support, said surfaces forming substantially transverse shoulders on said projec-*

*tions extending away from said outer face for interengagement with complementary shoulders carried by said support and receivable within said recess, said engagement surfaces being formed to accommodate vertically adjustable frontal application of said tooth on said support opposite said complementary surfaces formed thereon, and said engagement surfaces being susceptible to plasticizing and molecular bonding with a resinous bonding agent applicable thereto for rigidly joining said tooth to said support in vertically adjusted position thereon.*

*8. An artificial tooth adapted to be frontally joined to a metallic dental support, said tooth comprising a vertically elongated hardened resinous body having opposite crown and root ends, a tooth shaped outer face and a rear face opposite thereto, said body including inwardly recessed engagement surfaces having transverse and vertically elongated surface extent relative to said body for engagement with complementary dental support surfaces and forming a recess in said rear face extending toward said outer face interiorly of said body between said ends and transversely through said body between opposite sides thereof, said engagement surfaces forming vertically spaced transversely extending shoulders diverging away from said outer face for interengagement with complementary shoulders carried by said support in vertically adjustable relation thereon and said engagement surfaces forming transversely spaced vertically elongated shoulders extending away from said outer face on opposite sides of a groove adapted to receive a projection carried by said support for resisting lateral displacement of said tooth on said support, and said engagement surfaces being susceptible to plasticizing and molecular bonding with a resinous bonding agent applicable thereto for rigidly joining said tooth to said support in vertically adjusted position thereon.*

*9. An artificial facing adapted to be joined to a dental*

*support connectible to a tooth root, said facing comprising a vertically elongated hardened resinous body having a tooth shaped outer face and a rear face opposite thereto, said body including inwardly recessed engagement surfaces having transverse and vertically elongated surface extent relative to said body for engagement with complementary dental support surfaces and forming a cut-out in said rear face and at the root end of said body, said cut-out extending toward said outer face and transversely through said body, said surfaces forming a pair of transversely separated substantially vertically elongated projections on opposite sides of a groove extending toward said outer face and adapted to receive a lamella carried by said support, said surfaces forming substantially transverse shoulders on said projections extending away from said outer face for interengagement with complementary shoulders carried by said support and receivable within said recess, said engagement surfaces being formed to accommodate vertically adjustable frontal application of said body on said support opposite complementary surfaces formed thereon, and said engagement surfaces being susceptible to plasticizing and molecular bonding with a resinous bonding agent applicable thereto for rigidly joining said body to said support in vertically adjusted position thereon.*

References Cited in the file of this patent or the original patent

| | | |
|---|---|---|
| 319,829 | Low | June 9, 1885 |
| 675,881 | Cassullo | June 11, 1901 |
| 1,481,209 | Kauffman | Jan. 15, 1924 |
| 2,308,195 | Morris | Jan. 12, 1943 |
| 2,314,503 | Kurgas | Mar. 23, 1943 |
| 2,394,659 | Breyer | Feb. 12, 1946 |
| 2,398,671 | Saffir | Apr. 16, 1946 |